INVENTORS
ROBERT C. PUTNAM
IRA S. STEIN

BY *James J. Ralabate*
*Stanley Z. Cole*
ATTORNEYS

United States Patent Office 3,553,093
Patented Jan. 5, 1971

3,553,093
COLOR PHOTOELECTROPHORETIC
IMAGING PROCESS
Robert C. Putnam, Rochester, and Ira S. Stein, Penfield, N.Y., assignors to Xerox Corporation, Rochester, N.Y., a corporation of New York
Filed Mar. 19, 1965, Ser. No. 441,106
Int. Cl. G03g 13/22
U.S. Cl. 204—181                         6 Claims

ABSTRACT OF THE DISCLOSURE

A suspension comprising electrically photosensitive particles dispersed in a carrier liquid is exposed to imagewise light and field between at least two electrodes forming a pigment image on the surface of one of the electrodes. The other electrode is removed, cleaned or replaced and the imagewise exposure and field application is repeated at least one additional time, improving the quality of the final image.

---

Figure 1:
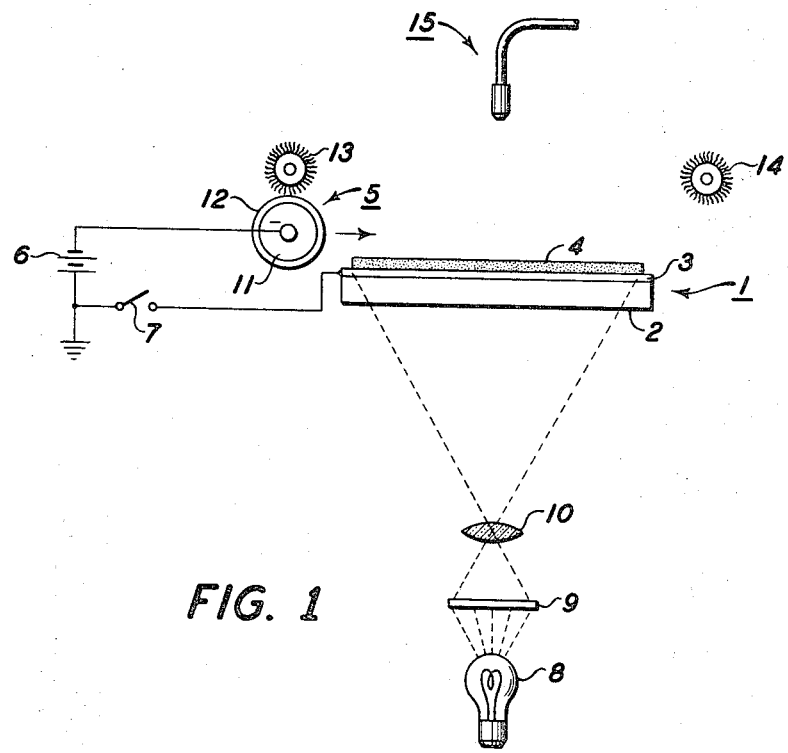

This invention relates in general to imaging systems and more specifically, to an improved electrophoretic imaging system.

There has been recently developed an electrophoretic imaging system capable of producing color images which utilizes electrically photosensitive particles. This process is described in detail and claimed in copending applications Ser. Nos. 384,737, now U.S. Pat. 3,384,565; 384,681, abandoned in favor of continuation-in-part application, Ser. No. 655,023, now U.S. Pat. 3,384,566; and 384,680, abandoned in favor of continuation-in-part application, Ser. No. 518,041, now U.S. Pat. 3,383,933; all filed July 23, 1964. In such an imaging system, variously colored light absorbing particles are suspended in a nonconductive liquid carrier. The suspension is placed between electrodes, subjected to a potential difference and exposed to an image. As these steps are completed, selective particle migration takes place in image configuration, providing a visible image at one or both of the electrodes. An essential component of the system is the suspended particles which must be electrically photosensitive and which apparently undergo a net change in charge polarity upon exposure to activating electromagnetic radiation, through interaction with one of the electrodes. In a monochromatic system particles of a single color are used, producing a single color image equivalent to conventional black-and-white photography. In a polychromatic system the images are produced in natural color because mixtures of two or more differently colored particles which are each sensitive only to light of a specific wave length of narrow range of wave lengths are used. Particles used in this system must have both intense pure colors and be highly photosensitive. It is preferred that the particles migrate with minimum exposure to activating electromagnetic radiation, and that particles of each color migrate to an equal extent upon equal exposure to light of the complementary color. Where the particle mix is exposed to a multicolored image, particles must migrate to one electrode in proportion to the intensity of the light which they absorb. This migration should take place with a minimum of electrical interaction between particles of different colors. In a preferred embodiment, as disclosed in the above mentioned copending applications, it is desired that particles selectively remain on one electrode in image configuration, with unwanted particles migrating to the other electrode.

For example, when a mixture comprising cyan, magenta, and yellow particles is exposed to an image by yellow light only, the exposed cyan and magenta particles should migrate to a first electrode, leaving behind an image made up of yellow particles on the second electrode. Similarly, when exposed to a multicolor image different colored particles absorb light of their complementary color in appropriate image areas and migrate to the fist electrode leaving a full color image on the second electrode corresponding to the original. This image may be viewed by removing the first electrode with the unwanted, migrated, particles adhering thereto. Obtaining maximum image density and satisfactory particle separation has been found to be difficult. It has been found that particles of some colors migrate more rapidly than particles of other colors and build up on the first electrode impeding the deposition of other unwanted particles. This degrades the image on the second electrode, since some unwanted particles remain. It has been found, for example, that yellow particles often migrate at a lower rate than cyan particles. Thus, in areas where both cyan and yellow particles should migrate to the first electrode, leaving a magenta image on the second electrode, the cyan particles migrate more rapidly and build up a layer on the first electrode, preventing proper migration and adherence of yellow particles. The image then has an undesirable yellow or orange cast in red areas. Thus, there is a continuing problem in electrophoretic imaging systems of removing unwanted particles leaving only those necessary to form the multicolor image desired.

It is, therefore an object of this invention to provide an electrophoretic imaging process which overcomes the above-noted deficiencies.

It is another object of this invention to provide a method for removing unwanted particles from a multicolor particle mix in an electrophoretic imaging system.

It is another object of this invention to provide apparatus for removing unwanted particles from a multicolor particle mix in an electrophoretic imaging device.

It is another object of this invention to provide a method of improving the quality of images produced in electrophoretic imaging systems.

It is still another object of this invention to provide a continuous method of forming electrophoretic images of high color purity.

It is still another object of this invention to provide an electrophoretic imaging process and apparatus capable of producing full color images of higher quality than was heretofore thought possible.

The foregoing objects and others are accomplished in accordance with this invention by providing an improved electrophoretic imaging process which comprises the steps of (1) subjecting a layer of a suspension of finely divided photosensitive particles in a carrier liquid to an electrical potential between a pair of electrodes, at least one of which is at least partially transparent, (2) exposing said suspension to an image through said transparent electrode while the potential is imposed on the suspension, whereby an image made up of particles is formed on said transparent electrode and unwanted particles migrate to and adhere to the other electrode, (3) removing said other electrode from contact with the suspension and cleaning the surface thereof of unwanted particles or replacing the surface material with clean material, (4) returning the now clean electrode into contact with the suspension, (5) reapplying the potential to the suspension, and (6) repeating the exposure and cleaning steps at least one additional time.

Additional unwanted particles migrate to the cleaned electrode and may be removed therewith. These steps of exposing, cleaning, and reexposing may be repeated as many additional times as desired. This process assures that all unwanted particles are removed, leaving an image of high color purity.

Figure 2:
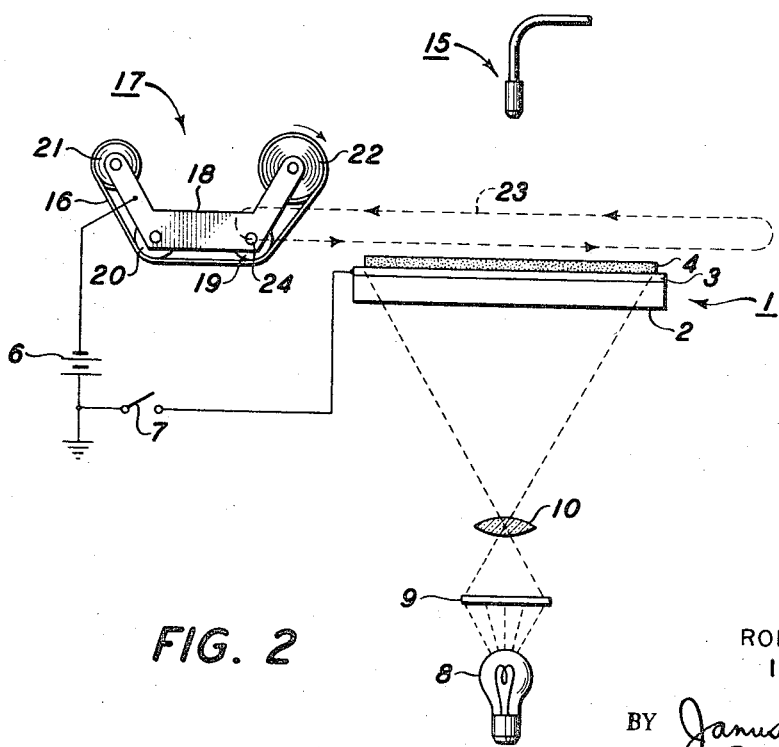

The advantages of this improved electrophoretic imaging process and apparatus will become apparent upon consideration of the following detailed disclosure of the invention; especially when taken in conjunction with the accompanying drawings wherein:

FIG. 1 shows a side view of a simple exemplary system for carrying out the steps of this invention wherein the first electrode is cleaned between exposure steps, and FIG. 2 shows a second embodiment similar to that of FIG. 1 but wherein the first electrode surface is replaced between exposure steps.

The relative sizes and shapes of elements as shown in the drawings should not be considered to represent actual preferred sizes or even proportional sizes because many elements have been purposely distorted in size or shape in order to more fully and clearly describe the invention.

Referring now to FIG. 1, there is seen a transparent electrode generally designated 1 which, in this exemplary instance, is made up of a layer of optically transparent glass 2 overcoated with a thin transparent layer 3 of tin oxide, commercially available under the name NESA glass. This electrode will hereinafter be referred to as the "injecting electrode." Coated on the surface of injecting electrode 1 is a thin layer 4 of finely divided photosensitive particles dispersed in an insulating carrier liquid. The term "photosensitive," for the purposes of this application, refers to the properties of a particle which, once attracted to the injecting electrode, will migrate away from it under the influence of an applied electric field when it is exposed to actinic electromagnetic radiation. For a detailed theoretical explanation of the apparent mechanism by which imaging takes place, see the above mentioned copending applications, S.N. 384,737; 384,681 and 384,680, the disclosures of which are incorporated herein by reference. Liquid suspension 4 may also contain a sensitizer and/or a binder for the pigment particles which is at least partially soluble in the suspending or carrier liquid. Adjacent to the liquid suspension 4 is a second electrode 5 hereinafter called the "blocking electrode," which is connected to one side of the potential source 6 through a switch 7. The opposite side of the potential source 6 is connected to the injecting electrode 1 so when switch 7 is closed, the electric field is applied across the liquid suspension 4 between electrodes 1 and 5. An image projector made up of a light source 8, a transparency 9, and a lens 10 is provided to expose the suspension 4 to a light image of the original transparency 9 to be reproduced. Electrode 5 is made in the form of a roller in this embodiment having a conductive central core 11 connected to the potential source 6. The core is covered with a layer of a blocking electrode material 12, which may be Baryta paper. The pigment suspension is exposed to the image to be reproduced while a potential is applied across the blocking and injecting electrodes by closing switch 7. Roller 5 is caused to roll across the top surface of injecting electrode 1 with switch 7 closed during the period of exposure. This light exposure causes exposed particles originally attracted to electrode 1 to migrate through the liquid and adhere to the surface of the blocking electrode, leaving behind an image on the injecting electrode surface which is a duplicate of the original transparency 9. After the roller 5 has made a first pass across the top surface of injecting electrode 1, it has adhered to its surface unwanted particles. These particles may be removed by rotating brush 14 against which the roller 5 is slowly rotated. Roller 5 may then be rolled back across the injecting electrode 1 while the suspension is again exposed in the same manner as before picking up additional unwanted particles. At the end of its travel roller 5 may be cleaned again by brush 13.

It should be understood that the brushes 13 and 14 shown in FIG. 1 are merely exemplary of the various means which could be used to clean the adhering particles from the blocking electrode. If desired, a single cleaning means 13 could be used, cleaning adhering particles from the blocking electrode after every second exposure pass across the injecting electrode 1. Obviously, the particles could be removed by manual wiping or washing them from the electrode surface. Any other suitable cleaning means could be used. Typical cleaning means include wiping roller, scrapers, or doctor blades, air blast means, solvent spray means, etc. Any of these particle removing means could be charged to a high potential utilizing electrostatic attractive forces as an aid in insuring complete particle removal. As many successive exposure and cleaning steps may be performed as is desired.

It has been found that the multipass technique with cleaning between passes removes a much higher proportion of unwanted pigment than does a single pass technique. This results in an image of much higher image brilliance and color purity. It has been found that about 6 passes of the roller across the pigment suspension produces optimum image quality consistent with time expended in the longer process. Additional exposure-cleaning steps performed after optimum color purity has been obtained tend to upset the proportionality of the three pigments making up the primary (red, green, blue) color as well as to lower the overall density of the image. Since the carrier liquid may somewhat evaporate during the more extended process, a spray nozzle 15 may be provided to add additional carrier liquid between exposure steps while the roller is being cleaned. The additional carrier liquid will maintain the suspenson in optimum condition for particle migration during the exposure steps.

Referring now to FIG. 2, there is seen a second exemplary embodiment of an apparatus for performing the process of this invention. In this embodiment unwanted pigment particles are removed by means of a replaceable carrier web 16 mounted on a tractor assembly 17. The tractor 17 comprises a frame 18 electrically connected to the potential source 6 and to the rollers 19 and 20. The frame also includes arms adapted to rotatably hold a takeup roll 21 and a supply roll 22. This web 16 is adapted to act as a blocking electrode when moved across the injecting electrode 1. As the tractor moves across the injecting electrode the web material 16 is unrolled from the supply roll 22 and rolled up on the takeup roll 21 at a rate such that the web contacts the injecting electrode without relative lateral movement. The dash line 23 schematically shows the path taken by the axle 24 of roller 19, indicating that the web material 16 contacts the pigment suspension 4 and injecting electrode only during movement of the tractor in one direction, in the drawing during the left-to-right pass. Exposure of the pigment suspension 4 on the injecting electrode 1 takes place during movement of the blocking electrode from left-to-right as explained in the discussion above of the embodiment shown in FIG. 1. As the tractor passes across the injecting electrode unwanted particles adhere to the web material 16 which may be Baryta paper. When the second left-to-right pass commences, fresh web material 16 contacts the pigment suspension and again removes a portion of the unwanted particles. The web material winds up on the takeup roll and may later be cleaned or disposed of. The nozzle 15 shown schematically may be used to add additional carrier liquid to the pigment suspension should it dry out excessively during the several pigment removal passes. Since additional unwanted pigment is removed with each pass, image quality is much higher with this multipass techniques then where only a single pass is used. It has been found that about 4 passes produces optimum image quality, constant with the additional time required and the cost of expended web material 16.

The increase in image quality and color purity and balance is surprisingly high with the multipass technique, well worth the added expense and delay inherent in the technique. The second embodiment has the disadvantage when compared to the embodiment of FIG. 1 in that web material 16 is consumed during the operation. However, this embodiment eliminates the problems of immediate disposal of particles removed in a roller cleaning operation. Also, ordinary cleaning of electrode surface material does not provide as truly clean a surface as does replacing it. Thus, where the surface material is replaced, optimum color purity is obtained with fewer exposure-cleaning steps. Optimum color purity generally results after about 4 exposure-cleaning steps with electrode surface replacement while 6 steps are generally required for optimum color purity where the electrode surface is merely superficially cleaned.

The embodiments shown in FIG. 1 and FIG. 2 should be understood as merely illustrative of the present invention. Obviously, a roller-type blocking electrode such as that shown at 5 in FIG. 1 could use replaceable web material such as shown in FIG. 2; the tractor type mechanism of FIG. 2 similarly being usable with a continuous belt of web material, cleanable between passes. Obviously, the blocking electrode could be cleaned manually, or the web material in the form of a sleeve for roller 5 or a continuous band surrounding rollers 19 and 20 could be replaced manually between exposure passes.

The photosensitive particles used in the process of this invention may be made up of any suitable composition. It is only required that these materials be (1) electrophoretically photo-sensitive, and (2) have the desired color characteristics. In a monochromatic system, particles of any material having the desired photosensitive characteristics may be used. In a polychromatic system, the particles are selected so that those different colors respond to different wavelengths in the visible spectrum corresponding to their principal absorption bands. The pigments should be selected so that their spectral response curves do not have substantial overlap, thus allowing for good color separation and substractive multicolor formation. In typical multicolor system, the particle dispersion should include cyan colored particles sensitive mainly to red light, magenta colored particles sensitive mainly to gren light and yellow colored particles sensitive mainly to blue light. When mixed together in a carrier liquid, these particles produce a black appearing liquid. When one or more of the particles are caused to migrate toward a first electrode, they leave behind particles on a second electrode which produce a color equivalent to the color of the impinging light. For use in both monochromatic and polychromatic systems, photosensitive organic pigment particles such as are described in detail in the above-mentioned copending applications, Ser. Nos. 384,737; 384,681; and 384,680 are preferred. However, any other suitable photosensitive material may be used. Typical photosensitive materials include many inorganic pigments such as zinc oxide, lead oxide and zinc chromate; organic pigments such as phthalocyanines and quinacridones; low molecular weight organic photosemiconductors such as oxidiazols, triazoles, pyrazolines, triazines, triphenylamine, organo-metallic photoconductors, imidazoles; polymeric organic photoconductors such as polyvinyl carbazole and polystyrene; various photosensitive charge-transfer complexes of aromatic resins and Lewis acids such as mixtures of Lewis acids and phenol-formaldehyde resins, epoxy resins, phenoxy resins, or polycarbonate resins; inorganic elemental photoconductors such as selenium and tellurium; and composite particles such as pigments or dyes dispersed in glassy or resinous binders. The above materials may have other materials added thereto to synergize, enhance or otherwise modify their properties. The materials may be dye sensitized, if desired, to modify their photosensitive and/or color properties. The particles may comprise a single compound or element, or may comprise mixtures or dispersions of several compositions, or may comprise coated particles.

The following illustrative examples point out the improvements obtained in image resolution and color density by means of the multipass technique of this invention. In each of the following examples, a tri-mix comprising a suspension of yellow, magenta, and cyan pigments in Sohio Odorless Solvent 3440, a petroleum fraction available from Standard Oil of Ohio, is exposed to light of a selected color. Integral and analytical densities of the pigment image remaining on the NESA glass surface are measured and calculated after each exposure-cleaning step. An exposure-cleaning step consists of two passes of the roller electrode over the suspension followed by cleaning of the adhering particles from the roller electrode.

Integral densities are measured on the basis of NESA plate transmission densities with a MacBeth Quantalog densitometer Model TD100. The integral densities are densities which correspond to total absorption of any and all pigments at the wavelength band corresponding to the color filter used. Analytical densities are calculated from the integral density by means of a Monroe analytical density computer. Analytical densities as calculated are due entirely to each individual pigment colorant in the sample. This is based on the method of determining analytical densities from known integral densities as described in "Principles of Color Photography," Evan, Hansen, and Brewer, 1953, pages 441–447. As can be seen in the tables accompanying the following examples, color density is optimum when the analytical density of unwanted colors reaches 0. In each of the following Examples I–VI, the tri-mix consists of 7.5 parts by weight of Algol yellow, 7.5 parts by weight Watchung Red B, a barium salt of 1-(4'-methyl-5'-chloroazobenzene-2'-sulfonic acid)-2-hydroxy-3-naphthoic acid, C.I. No. 15865, available from E. I. Du Pont de Nemours & Co., and 10 parts by weight Monolight Fast Blue G.S., the alpha form of metal-free phthalocyanine, C.I. No. 74100. This tri-mix is suspended in about 330 parts by volume Sohio Odorless Solvent 3440 and coated on the NESA glass substrate. All of the following Examples I–XII are carried out in an apparatus of the general type illustrated in FIG. 1, except that only a single cleaning means, such as brush 13 is used. Thus, the roller electrode is cleaned only after a left-to-right exposure pass. The roller electrode has a coating of Baryta paper on its surface and is approximately 2½ inches in diameter. The roller moves across the plate surface at about 1.45 centimeters per second. The plate employed is roughly 3 inches square and is exposed with a light intensity of about 8,000 ft. candles as measured on the uncoated NESA glass surface with no image in position. The magnitude of the applied potential is about 2500 volts. The exposure in Examples I–VI is made with a 3200° Kelvin lamp through a color filter as designated in each example.

EXAMPLE I

The tri-mix is exposed through a red filter, Wratten 29, thus exposing the suspension to red light only. Ideally, all cyan particles will migrate to the blocking electrode and be removed therewith leaving magenta and yellow particles on the NESA surface forming a red image. As shown in the table below, after 6 exposure-cleaning steps all unwanted cyan particles have been removed.

TABLE I

| No. of exposure-cleaning steps | Integral density | | | Analytical density | | |
|---|---|---|---|---|---|---|
| | Cyan | Magenta | Yellow | Cyan | Magenta | Yellow |
| 1 | 0.78 | 0.86 | 0.70 | 0.68 | 0.47 | 0.22 |
| 2 | 0.62 | 0.85 | 0.68 | 0.49 | 0.53 | 0.23 |
| 3 | 0.30 | 0.74 | 0.59 | 0.17 | 0.58 | 0.26 |
| 4 | 0.23 | 0.67 | 0.52 | 0.11 | 0.54 | 0.22 |
| 5 | 0.18 | 0.68 | 0.54 | 0.05 | 0.57 | 0.27 |
| 6 | 0.09 | 0.46 | 0.37 | 0.00 | 0.39 | 0.19 |
| 7 | 0.04 | 0.16 | 0.07 | 0.00 | 0.16 | 0.00 |

EXAMPLE II

The tri-mix is exposed to green light only through a Wratten 61 filter. Ideally, all magenta particles will migrate to the blocking electrode, leaving cyan and yellow particles on the NESA glass plate forming a green image.

As shown by the table below, all magenta particles have been removed after four exposure-cleaning steps.

TABLE II

| No. of exposure-cleaning steps | Integral density | | | Analytical density | | |
|---|---|---|---|---|---|---|
| | Cyan | Magenta | Yellow | Cyan | Magenta | Yellow |
| 1 | 1.34 | 1.02 | 0.84 | 1.26 | 0.40 | 0.13 |
| 2 | 1.04 | 0.69 | 0.59 | 0.98 | 0.19 | 1.11 |
| 3 | 0.78 | 0.47 | 0.44 | 0.72 | 0.08 | 1.12 |
| 4 | 0.64 | 0.31 | 0.24 | 0.60 | 0.00 | 0.10 |
| 5 | 0.60 | 0.32 | 0.37 | 0.54 | 0.04 | 0.13 |
| 6 | 0.49 | 0.19 | 0.25 | 0.45 | 0.00 | 0.08 |
| 7 | 0.23 | 0.13 | 0.35 | 0.13 | 0.00 | 0.30 |

EXAMPLE III

The tri-mix is exposed to blue light only through a Wratten 47B filter. Ideally, all yellow particles will migrate to the blocking electrode, leaving magenta and cyan particles on the NESA glass plate forming a blue image. As shown by the table below, all yellow particles have been removed after 3 exposure-cleaning steps.

TABLE III

| No. of exposure-cleaning steps | Integral density | | | Analytical density | | |
|---|---|---|---|---|---|---|
| | Cyan | Magenta | Yellow | Cyan | Magenta | Yellow |
| 1 | 1.45 | 1.14 | 0.95 | 1.35 | 0.48 | 0.18 |
| 2 | 1.26 | 0.88 | 0.70 | 1.20 | 0.31 | 0.07 |
| 3 | 0.85 | 0.48 | 0.37 | 0.82 | 0.10 | 0.00 |
| 4 | 0.79 | 0.39 | 0.27 | 0.78 | 0.04 | 0.00 |
| 5 | 0.63 | 0.31 | 0.22 | 0.62 | 0.02 | 0.00 |
| 6 | 0.57 | 0.19 | 0.11 | 0.51 | 0.00 | 0.00 |
| 7 | 0.37 | 0.14 | 0.07 | 0.37 | 0.00 | 0.00 |

EXAMPLE IV

The tri-mix is exposed to cyan light only through a Wratten 44A filter. Ideally, all magenta and yellow particles will migrate to the blocking electrode, leaving a cyan image on the NESA glass plate. As shown by the table below, all magenta particles have been removed after 4 exposure-cleaning steps and all yellow particles after 5 steps.

TABLE IV

| No. of exposure-cleaning steps | Integral density | | | Analytical density | | |
|---|---|---|---|---|---|---|
| | Cyan | Magenta | Yellow | Cyan | Magenta | Yellow |
| 1 | 1.16 | 1.10 | 0.79 | 1.07 | 0.58 | 0.09 |
| 2 | 1.12 | 0.73 | 0.66 | 1.06 | 0.20 | 0.12 |
| 3 | 0.81 | 0.47 | 9.46 | 0.77 | 0.08 | 0.12 |
| 4 | 0.60 | 9.25 | 0.26 | 0.58 | 0.00 | 0.04 |
| 5 | 9.45 | 0.17 | 0.18 | 0.42 | 0.00 | 0.00 |
| 6 | 0.40 | 0.13 | 0.13 | 0.49 | 0.00 | 0.00 |
| 7 | 0.23 | 0.05 | 0.05 | 0.23 | 0.00 | 0.00 |

EXAMPLE V

The tri-mix is exposed to magenta light only through a Wratten 32 filter. Ideally, all cyan and yellow particles will migrate to the blocking electrode, leaving a magenta image on the NESA glass plate. As shown by the table below, all cyan particles have been removed after 6 exposure-cleaning steps, and almost all yellow particles have been rtmoved after 7 steps.

TABLE V

| No. of exposure-cleaning steps | Integral density | | | Analytical density | | |
|---|---|---|---|---|---|---|
| | Cyan | Magenta | Yellow | Cyan | Magenta | Yellow |
| 1 | 0.82 | 0.90 | 0.76 | 0.70 | 0.51 | 0.24 |
| 2 | 0.56 | 0.85 | 0.71 | 0.41 | 0.57 | 0.28 |
| 3 | 0.34 | 0.79 | 0.66 | 0.20 | 0.59 | 0.30 |
| 4 | 0.21 | 9.63 | 0.49 | 0.10 | 0.52 | 0.22 |
| 5 | 0.12 | 0.47 | 0.11 | 0.02 | 0.38 | 0.21 |
| 6 | 0.08 | 0.15 | 0.12 | 0.00 | 0.12 | 0.08 |
| 7 | 0.01 | 0.07 | 0.05 | 0.00 | 0.06 | 0.02 |

EXAMPLE VI

The tri-mix is exposed to yellow light only through a Wratten 12 filter. Ideally, all cyan and magenta particles will migrate to the blocking electrode, leaving a yellow image on the NESA glass plate. As shown by the table below, all cyan particles have been removed after 4 exposure-cleaning steps, and all magenta particles have been removed after 6 steps.

TABLE VI

| No. of exposure-cleaning steps | Integral density | | | Analytical density | | |
|---|---|---|---|---|---|---|
| | Cyan | Magenta | Yellow | Cyan | Magenta | Yellow |
| 1 | 0.83 | 0.85 | 0.72 | 0.71 | 0.43 | 0.23 |
| 2 | 0.73 | 0.81 | 0.65 | 0.63 | 9.45 | 0.19 |
| 3 | 0.32 | 9.53 | 0.54 | 0.19 | 0.34 | 0.31 |
| 4 | 0.11 | 0.13 | 0.30 | 0.00 | 0.04 | 0.29 |
| 5 | 0.07 | 0.11 | 0.28 | 0.00 | 0.01 | 0.28 |
| 6 | 0.03 | 0.06 | 0.18 | 0.00 | 0.00 | 0.18 |
| 7 | 0.05 | 0.09 | 9.13 | 0.00 | 0.02 | 0.11 |

In each of the following examples, a tri-mix comprising equal amounts of cyan, magenta and yellow particles is exposed as in Example I, above, except that the suspension is exposed to a multicolor, "Kodachrome" image instead of merely to monochromatic light. Ten exposure-cleaning steps are performed, with visual evaluation of the multicolor images produced after each step. Image quality is measured and listed in Table VII below on a 0–100 scale, wherein 0 indicates no appreciable image and 100 indicates an optimum image. In each of the following examples, 10 sets of exposure and cleaning steps are performed; Table VII lists the numbers of the examples and image quality after the first, second, third, fourth, fifth, sixth, eighth and tenth exposure-cleaning steps.

EXAMPLE VII

The tri-mix comprises cyan particles, Monolite Fast Blue GS, the alpha form of metal-free phthalocyanine, C.I. No. 74100 available from the Arnold Hoffman Co., magenta particles, Watchung Red B, a barium salt of 1-(4'-methyl - 5' - chloro - azobenzene-2'-sulfonic acid)-2-hydroxy-3-naphthoic acid, C.I. No. 15865, available from E. I. du Pont de Nemours & Co.; and yellow particles, 1 - cyano-2,3-phthaloyl-7,8-benzopyrrocoline, prepared by the first technique given for its synthesis on page 1215 of the Mar. 5, 1957, issue of the Journal of the American Chemical Society.

EXAMPLE VIII

The tri-mix comprises cyan particles, Cyan Blue Toner GTNF, the beta form of copper phthalocyanine, available from Collway Colors Corp.; magenta particles, Big Mac Red, available from Holland Suco Co.; and yellow particles N-2"(1,3"-thiazole) - 8,13 - dioxodinaphtho-(2,1-6,2',3'-d)-furan-6-carboxamide, prepared as disclosed in copending application Ser. No. 421,280, filed Dec. 28, 1964, now U.S. Pat. 3,488,028.

EXAMPLE IX

The tri-mix comprises cyan particles, Cyan Blue Toner GTNF, the beta form of copper phthalocyanine, C.I. No. 74160, available from Collway Colors Corp.; magenta particles, Harrison Red Co.; a barium salt of 1-(4'-methyl-5'-chloro-azobenzene - 2' - sulfonic acid)-2-hydroxy-3-naphthoic acid, C.I. No. 15867, available from Federal Colors; and yellow particles, Algol Yellow G.C., 1,2,5,6-di(C,C' - diphenyl) - thiazole - anthraquinone, C.I. No. 67300, available from General Dye Stuffs Co.

EXAMPLE X

The tri-mix comprises cyan particles, Diane Blue, 3,3'-methoxy - 4,4' - diphenyl - bis (1"-azo-2"-hydroxy-3"-naphthanilide) C.I. No. 21180, available from Harmon Colors Co; magenta particles, Quindo Magenta RV–6803, a quinacridone pigment available from Harmon Colors Co.; and yellow particles, 8, 13-dioxodinaphtho-(2,1-b; 2',3'-d)-furan-6-carbox - p - methoxyanilide, prepared as disclosed in copending application Ser. No. 421,589 filed Dec. 28, 1964, now abandoned.

EXAMPLE XI

The tri-mix comprises cyan particles Indofast Violet Lake, dichloro-9-18-isoviolanthrone, C.I. No. 60010, available from Harmon Colors Co.; magenta particles, Vulcan Fast Red BBE Toner 35–2201, 3,3' - dimethoxy-4,4' - biphenyl - bis(1" - phenyl - 3"-methyl-4"-azo-2"-pyrazolin-5"-one), C.I. No. 21200, available from Collway Colors Corp.; and yellow particles, Indofast Yellow Toner, flavanthrone, C.I. No. 70600, available from Harmon Colors Co.

TABLE VII

| Example | Number of exposure-cleaning steps | | | | | | | |
|---|---|---|---|---|---|---|---|---|
| | 1 | 2 | 3 | 4 | 5 | 6 | 8 | 10 |
| VII | 5 | 15 | 25 | 62 | 85 | 95 | 90 | 85 |
| VIII | 10 | 20 | 30 | 75 | 90 | 85 | 80 | 75 |
| IX | 5 | 15 | 25 | 75 | 95 | 90 | 85 | 75 |
| X | 10 | 20 | 30 | 90 | 90 | 95 | 90 | 75 |
| XI | 10 | 25 | 55 | 80 | 90 | 85 | 80 | 75 |

As shown by the above table, the greatest increase in image quality comes with the third or fourth exposure-cleaning step. Highest image quality generally occurs after the fourth to sixth exposure-cleaning step. Thereafter, additional cleaning excessively removes undesirable particles in lighter image areas.

Although specific structures and materials have been described in the above examples relating to electrophoretic imaging systems, it should be realized that the color purity improvement process of this invention could be used with other structures and processes with similar results. Other suitable particles, carriers, electrode materials, etc. could be used as desired. The particle suspension may include other materials, such as imaging fixing agents, sensitizers, etc. Other modifications and ramifications of the present invention will occur to those skilled in the art upon a reading of the present disclosure. These are intended to be encompassed within the scope of this invention.

What is claimed is:

1. The method of imaging which comprises the steps of at least twice subjecting a layer of a suspension comprising finely divided photosensitive particles of two or more colors in an insulating carrier liquid to an applied potential between at least two electrodes, at least one of which electrodes is at least partially transparent, and exposing said suspension to an image through said transparent electrode with a source of activating electromagnetic radiation until an image is formed on said transparent electrode and unwanted particles migrate to and adhere to the other electrode and before said suspension is subjected to an applied potential and exposed to activating electromagnetic radiation the second and on each subsequent occasion, separating said other electrode from said suspension and replacing it with an electrode free from unwanted particles.

2. The method of claim 1 wherein the steps of subjecting said suspension to an applied potential and exposing it to electromagnetic radiation are performed at least four times.

3. The method of claim 1 wherein said separating and replacing steps are repeated at least three times.

4. The method of imaging which comprises the steps of at least twice subjecting a layer of a suspension comprising finely divided photosensitive particles of two or more colors in an insulating carrier liquid to an applied potential between at least two electrodes, at least one of which electrodes is at least partially transparent, and exposing said suspension to an image through said transparent electrode with a source of activating electromagnetic radiation until an image is formed on said transparent electrode and unwanted particles migrate to and adhere to the other electrode and before said suspension is subjected to an applied potential and exposed to activating electromagnetic radiation the second and on each subsequent occasion, separating said other electrode from said suspension, removing adhering unwanted particles from the surface of said other electrode and returning said other electrode into contact with said suspension.

5. The method of imaging which comprises the steps of at least twice subjecting a layer of a suspension comprising finely divided photosensitive particles of two or more colors in an insulating carrier liquid to an applied potential between at least two electrodes, at least one of which electrodes is at least partially transparent, and exposing said suspension to an image through said transparent electrode with a source of activating electromagnetic radiation until an image is formed on said transparent electrode and unwanted particles migrate to and adhere to the other electrode and before said suspension is subjected to an applied potential and exposed to activating electromagnetic radiation the second and on each subsequent occasion, separating said other electrode from said suspension, replacing the surface of said electrode with new surface material and returning the electrode into contact with the suspension.

6. The method of imaging comprising the steps of at least twice subjecting a layer of suspension comprising a plurality of photosensitive particles of at least two different colors in an insulating carrier liquid to an applied potential between first and second electrodes and exposing said suspension to an image with a source of activating electromagnetic radiation with an image being formed on said first electrode upon the migration of unwanted particles to the second electrode and before the suspension is subjected to an applied potential and exposed to activating electromagnetic radiation the second and any subsequent occasion, separating the second electrode from the suspension and replacing it with an electrode free from unwanted particles.

References Cited

UNITED STATES PATENTS

| 3,247,081 | 4/1966 | Reithel | 204—18 |
| 3,383,993 | 5/1968 | Yeh | 204—181 |
| 3,384,565 | 5/1968 | Tulagin et al. | 204—181 |
| 3,384,566 | 5/1968 | Clark | 204—181 |

GEORGE F. LESMES, Primary Examiner

J. C. COOPER III, Assistant Examiner

U.S. Cl. X.R.

96—1, 1.2, 1.3